March 28, 1944.  A. A. YOUNG  2,345,084
METER MOUNTING
Filed March 24, 1941  2 Sheets-Sheet 1
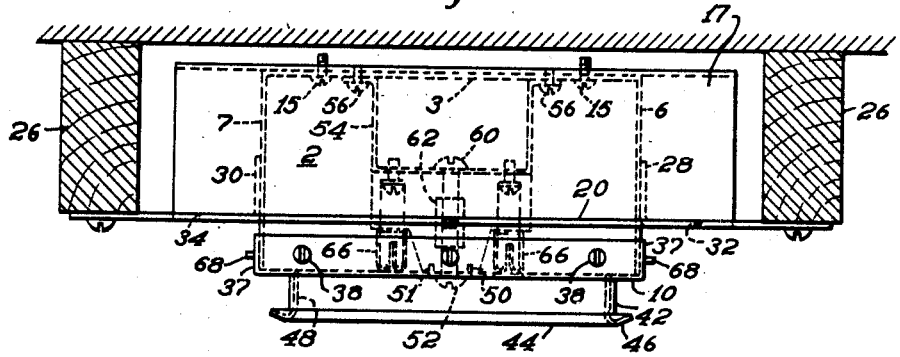
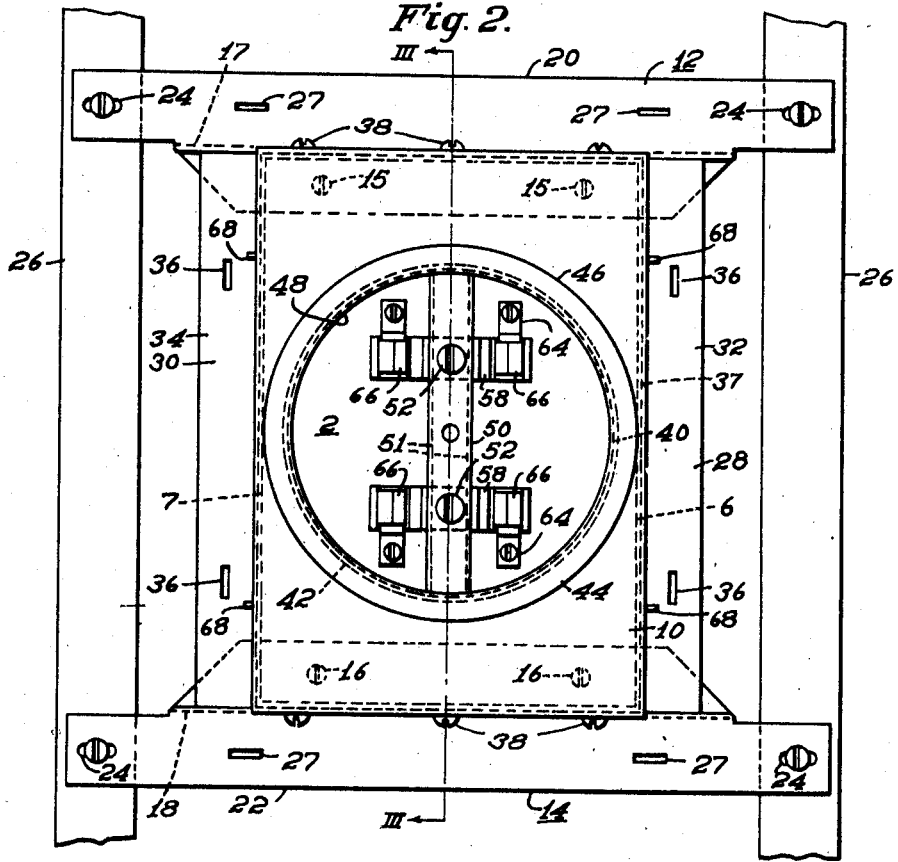
WITNESSES:
Edward Michaels
David Kreider
INVENTOR
Arthur A. Young.
BY
ATTORNEY March 28, 1944.                    A. A. YOUNG                        2,345,084
                                  METER MOUNTING
                             Filed March 24, 1941            2 Sheets-Sheet 2
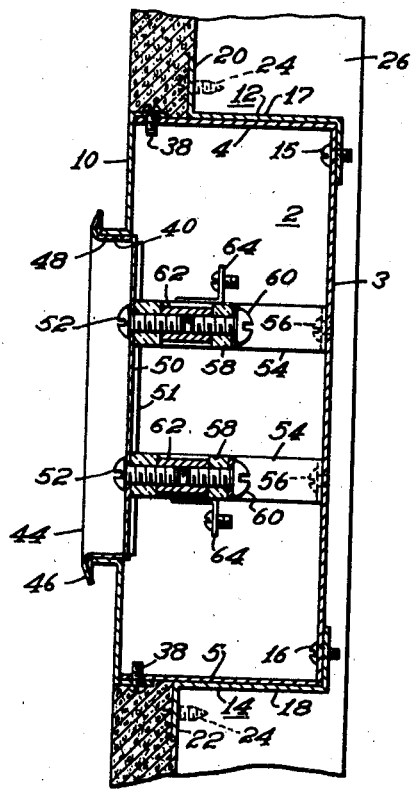
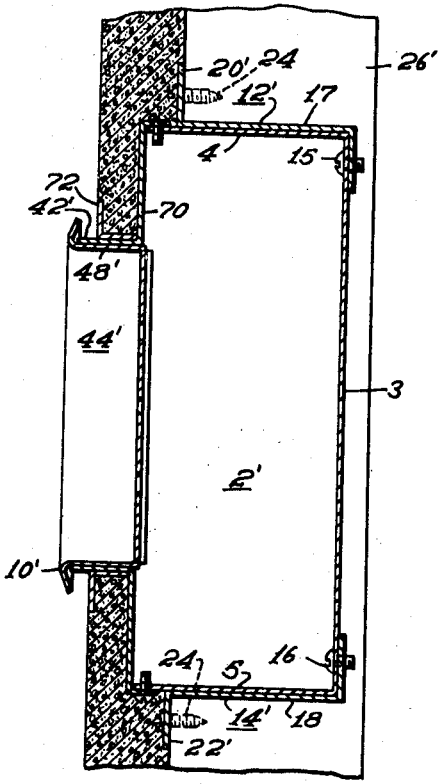
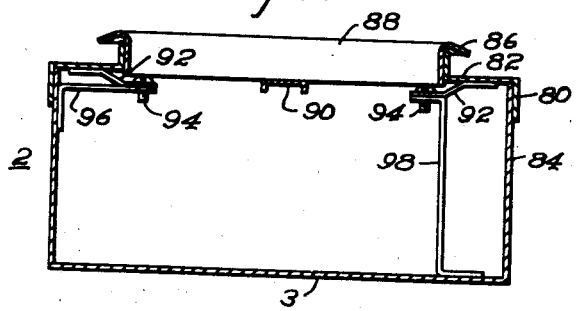
WITNESSES:
INVENTOR
Arthur A. Young.
BY
ATTORNEY Patented Mar. 28, 1944

2,345,084

UNITED STATES PATENT OFFICE 2,345,084

METER MOUNTING

Arthur A. Young, Manchester, N. H., assignor to Anchor Manufacturing Company, Boston, Mass., a corporation of Massachusetts Application March 24, 1941, Serial No. 384,928

7 Claims. (Cl. 175—224)

The present invention relates to mountings for watthour meters or other electrical instrumentalities, and it has particular relation to the mounting of such devices which are housed in the type of casing used for watthour meters of the so-called detachable type.

This type of construction is shown, for example, in Patent No. 1,969,499, issued August 7, 1934, to Bradshaw et al. In such a meter the casing has contact blades projecting from the base thereof for detachable association with complementary contact jaws disposed on a support to connect it to a circuit to be metered. Watthour meters, for example, may be individually mounted on a single support or trough section or a plurality of such meters may be mounted on a single supporting trough in the case of multiple metering installations.

In all such assemblies where it is desired to mount the meters on a support or housing which is substantially larger than that shown in the above-identified patent, the provision of a support which is not only strong and inexpensive, but also weatherproof becomes an important problem. These features are particularly essential where a flush mounting is required within either an inside or outside wall of a building. In the latter case, the provision of weatherproof qualities becomes of prime importance.

It is, accordingly, an object of the present invention to provide novel and improved box or trough equipment for the mounting of electrical instruments.

It is another object of the invention to provide a watthour meter support which is particularly strong and weatherproof as well as inexpensive to construct.

Another object of the invention is to provide a flush mounted support for a detachable type watthour meter which includes conveniently arranged members for resiliently mounting the support within a wall structure, and, in addition, provides a completely weatherproof structure.

A further object is to provide a mounting for a plastered or similar wall which does not require great accuracy in locating, nor some additional means for adjusting the plaster level.

Other objects and advantages of the invention will appear from the following detailed description taken in conjunction with the accompanying drawings, in which:

Figure 1 is a top plan view of a support constructed in accordance with the invention showing it secured on the vertical studs of a building wall;

Fig. 2 is a front elevational view of the structure of Fig. 1;

Fig. 3 is a vertical sectional view taken along a line III—III of Fig. 2 and showing its position with respect to the completed wall structure;

Fig. 4 is a view similar to Fig. 3 of a modified mounting arrangement in accordance with the invention; and Fig. 5 is horizontal sectional view of a modified form of the invention.

Referring to Figs. 1 through 3 of the drawings, the structure comprises a receptacle indicated at 2 which may be made from a single piece of sheet metal bent to form a back portion 3, top and bottom members 4 and 5, and side members 6 and 7, respectively. The joints between the side members and the top and bottom members are preferably welded to make them completely weatherproof.

The front edge of this receptacle 2 is snugly engaged by a cover member 10 in a manner which will be described more fully hereinafter. Hanger brackets 12 and 14 are attached to the upper and lower parts, respectively, of the back member 3, as indicated at 15 and 16, while horizontally disposed portions 17 and 18 (Fig. 3) thereof may engage the top 4 and bottom 5 of the receptacle or may be spaced therefrom. The hanger brackets are preferably of sheet metal and include members 20 and 22 which are horizontally disposed in a plane parallel to the front of the receptacle and are apertured at their ends, as indicated at 24, to facilitate attaching them to stud members 26 of a building wall. The members 20 and 22 may be further apertured as at 27 to permit attaching them to the ends of vertically disposed building laths, as by means of wood screws. Since these brackets are not attached to the top and bottom of the receptacle a resilient support is provided which will not crack the plaster wall as a result of expansion due to temperature changes.

L-shaped bracket members 28 and 30 may be secured to the front portion of the side members 6 and 7, respectively, as by welding or the like, and include vertically disposed hanger portions indicated at 32 and 34. These hanger portions are disposed parallel to the front of the receptacle, and they likewise are provided with apertures, as at 35, for securing to the end portions of horizontal laths which must be cut away to permit the disposal of the receptacle within the wall.

The front cover member 10 includes a perimetral side flange or collar 37 which engages the outer edge of the receptacle 2, as shown. The cover flange portion and the edge of the receptacle are preferably provided with coinciding apertures to permit the disposal of machine screws 38 therein in order to prevent accidental or unauthorized removal of the cover 10. The cover member has a circular aperture 40 which is defined by a forwardly extending flange or collar member 42. This collar is preferably formed integral with the cover, as by a drawing operation, to insure that no moisture whatever may pass through a joint therebetween.

A socket member, indicated generally at 44, includes an outwardly flaring end portion 46 for engagement with the casing of a detachable meter of the type described, and also comprises a circular ring portion 48 which is adapted to fit snugly within the cover collar 42 in weatherproof relationship. This socket member 44 also includes a bridge or saddle-bar 50, which is preferably integrally formed and may be apertured as shown to permit a pair of machine screws 52 to pass therethrough for a purpose which will hereinafter be described. The bridge is preferably provided with rearwardly extending side flanges shown at 51.

A pair of resilient U-shaped supports 54 are secured to the rear portion 3 of the receptacle, within the receptacle, in vertically spaced relationship, as by means of machine screws 56. An insulating block 58 is secured to each of these supports by a machine screw 60 extending through an opening in the support 54 and threaded into a nut 62 disposed in the respective block. Wiring terminals 64 of a usual type are supported by these insulating blocks as are contact jaws 66. These contact jaws are electrically connected to the respective wiring terminals and are so disposed as to engage the terminal blades of a detachable type meter.

The machine screws 52 which have previously been described as extending through openings in the bridge 50 also screw into the nuts 62. Thus, this construction not only insures that the contact jaws 66 are always in the proper position relative to the socket but the bridge is in this manner secured to the rear portion 3 of the receptacle 2. This prevents accidental displacement of the socket from the receptacle and presents a structure in which the socket may be removed readily when desired.

From the foregoing description, it will be understood that the support herein disclosed may be secured to the studs 26 of a building wall by means of wood screws and that the hanger member along with the vertical members 32 and 34 may additionally engage the lathing of the wall. The front cover 10 is then pressed onto the receptacle prior to the plastering operation. As shown in Fig. 3, the plaster is applied flush with the front of the cover 10 and loops or projections may be provided on the flanges 37 of this cover, as indicated at 68, to aid in holding the plaster in position.

In Fig. 4 the apparatus previously described is shown as modified slightly to make it more suitable for an installation in which the front of the receptacle is disposed behind the plaster. A receptacle 2', which may be of the same size and shape as that shown in the preceding figures of the drawings, is supported from studs 26' by means of brackets 12' and 14', respectively. These brackets may be so proportioned that the arms 20' and 22' extend closer to the front of the receptacle as is desirable in this type of mounting. The collar member 42' of the front cover 10' and the ring portion 48' of the socket 44' are, of course, long enough to extend through the plaster.

In this installation of Fig. 4, a ring member 70 having a flush flange portion 72 is preferably placed in the outer edge of the plaster around the meter opening. With this construction it is possible to rest a tool against the flange 72 to pry the socket 44' off of the receptacle 2' without damaging the plaster. It will be understood that the apparatus of Fig. 4 may be the same as that previously described except for the particulars set forth above.

In Fig. 5 is shown a modified arrangement for securing the cover on a receptacle. In this figure, a collar 80 on a cover 82 is proportioned to frictionally engage the sides of a receptacle 84. The cover includes an outwardly extending collar 86 within which a socket 88 having an integral bridge 90 is adapted to fit, as previously described.

Metal straps 92 are secured to diametrically opposite points on the interior of the cover 82, and extend inwardly toward the center of the opening therein. These straps may be secured to the cover in any suitable manner such as by welding and their inner ends are apertured to receive machine screws 94 in a position readily accessible through the opening in the cover. Another strap or bracket 96, which may be welded to the side of the receptacle, extends inwardly beneath one of the straps 92 and is provided with a threaded opening into which one of the screws 94 extends. The other screw is threaded into an opening in a strap 98 secured to the bottom of the receptacle as shown.

It will readily appear the cover of the device shown in Fig. 5 may be securely and yet releasably secured to the receptacle. The screws 94 are readily accessible yet are protected from rusting. This arrangement is particularly suited for installations such as that shown in Figs. 1, 2 and 3 wherein the front of the cover is mounted flush with the plaster and not covered thereby. While it is preferred to connect one of the supporting strips to the side of the receptacle and the other to the back thereof as shown, it will appear that both of these strips may be supported from the same portion of the receptacle as desired.

From the foregoing, it will appear that the present invention provides a complete meter support which is particularly sturdy and may be installed with a minimum of time and effort. The device may be made completely weatherproof and, despite these advantages, is relatively inexpensive to manufacture. Because of the ease with which the socket member may be removed and replaced, the wiring may be inspected or repaired by the proper authorities. Another important feature of the apparatus is that the socket bridge member is always in the same position relative to the contact jaws insuring that there is always contact over the full area of the terminal blades of the meter with these jaws regardless of the level of the plastered surface. The hanger brackets being secured to the back rather than the top of the receptacle provide a resilient support which will not cause cracking of the plaster due to temperature changes. Although particular advantages result from employing all of the features of the invention together in the same structure, it will appear that they likewise offer advantages when employed individually.

Since many modifications may be made in the exact structure shown and described, it is intended that the invention shall only be limited by the scope of the appended claims.

I claim as my invention:

1. In a mounting for a meter of the detachable type, a receptacle including a cover having an opening surrounded by a projecting ring member, a meter supporting socket proportioned to fit removably within said ring member in frictional engagement therewith and including a diametrically disposed bridge member, and means accessible through the opening in said cover for releasably securing said bridge member to said receptacle.

2. In a mounting for an electrical meter of the type having terminal blades projecting from the casing thereof, a receptacle including a cover having an opening surrounded by a projecting ring member, contact means including an insulating block supporting contact jaws for engaging said terminal blades, means for securing said contact means to said receptacle, a meter supporting socket proportioned to fit releasably within said ring member in frictional engagement therewith and including a diametrically disposed bridge member, and means accessible through the opening in said cover for releasably securing said bridge member to said insulating block.

3. In a mounting for an electrical meter of the type having terminal blades projecting from the casing thereof, a receptacle including a cover having an opening surrounded by a forwardly extending ring member, contact means including an insulating block supporting contact jaws for engaging said terminal blades, means for securing said contact means within said receptacle, a meter supporting socket including a ring portion proportioned to fit releasably within said ring member in frictional engagement therewith and a diametrically disposed bridge member for engaging the insulating block of said contact means, and means for releasably securing said bridge member to said receptacle in a predetermined relationship to said insulating block to secure said socket thereto in a predetermined relationship to said contact jaws.

4. In a mounting for a meter of the detachable type, a receptacle having an open front, a cover for said receptacle having a collar portion for frictionally engaging the side walls of said receptacle, said cover having therein an opening surrounded by a ring projecting therefrom, a first pair of spaced clamping strips secured to the back of said cover and extending inwardly past the edge of the opening therein, a second pair of clamping strips disposed in said receptacle, means for securing one of said second pair of strips to a side wall of said receptacle and the other to the back wall thereof, said second group of strips being so proportioned that each of them engages the inner end of one of the strips in said first pair, means accessible through the opening in said cover for releasably securing the engaging strips together to secure said cover to said receptacle, and a meter supporting socket proportioned to fit within said ring in frictional engagement therewith.

5. In a mounting installation for a meter of the detachable type, a receptacle including a cover having an opening surrounded by an outwardly projecting ring, means for securing said receptacle within the wall of a building with the plaster thereof extending over said cover and a portion of said ring extending therethrough, a meter supporting socket proportioned to fit within said ring in removable frictional engagement therewith, and a flanged ring member disposed over the corner of the plaster about said cover ring.

6. In a mounting for a meter of the detachable type having terminal blades projecting from the casing thereof, a receptacle having an open front, a cover for said receptacle having a collar portion for frictionally engaging the side walls of said receptacle to secure it releasably in position thereon, said cover having a projecting ring defining an opening therein, contact means including an insulating block supporting contact jaws for engaging said terminal blades, means for securing said contact means within said receptacle with the terminal blades disposed opposite the opening in said cover, a meter supporting socket including a ring portion designed to fit releasably within said ring member in frictional engagement therewith and a diametrically disposed bridge member for engaging the insulating block of said contact means, and means for releasably securing said bridge member to said receptacle to secure said cover and socket thereto.

7. In a mounting for a meter of the detachable type, a receptacle having an open front, a cover for said receptacle having a collar portion for frictionally engaging the side walls of said receptacle, said cover having therein an opening surrounded by a meter supporting socket, a first pair of spaced clamping strips secured to the back of said cover and extending inwardly past the edge of the opening therein, a second pair of clamping strips disposed in said receptacle, means for securing one of said second pair of strips to a side wall of said receptacle and the other to the back wall thereof, said second pair of strips being so proportioned that each of them engages the inner end of one of the strips in said first pair, and means accessible through the opening in said cover for releasably securing the engaging strips together to secure said cover to said receptacle.

ARTHUR A. YOUNG.